United States Patent [19]
Kahler et al.

[11] Patent Number: 5,716,840
[45] Date of Patent: Feb. 10, 1998

[54] DISPOSABLE OIL PAN WITH BIO-REMEDIATION FILLER

[75] Inventors: Eugene J. Kahler, Wilmington, Ill.; Jeffrey L. Roseberry, 2656 Broadway Ave., Evanston, Ill. 60201

[73] Assignee: Jeffrey L. Roseberry, Evanston, Ill.

[21] Appl. No.: 712,440

[22] Filed: Sep. 11, 1996

[51] Int. Cl.⁶ .................................................. D06M 16/00
[52] U.S. Cl. .................. 435/264; 435/281; 435/297.1; 435/305.1; 123/198 E; 220/573
[58] Field of Search ............... 123/198 E; 435/264, 435/281, 289.1, 297.1, 305.1; 220/573

[56] References Cited

U.S. PATENT DOCUMENTS

| | | | |
|---|---|---|---|
| 4,530,763 | 7/1985 | Clyde et al. | 210/610 |
| 5,314,620 | 5/1994 | Staniec | 210/611 |
| 5,404,848 | 4/1995 | Nelson | 123/198 E |

Primary Examiner—David A. Redding
Attorney, Agent, or Firm—Baker & McKenzie

[57] ABSTRACT

An inexpensive and disposable oil pan used for the collection and disposal of used motor oil drained from an automobile's crankcase. The preferred oil pan is formed from a cut-out of lightweight corrugated paperboard and contains an absorbent filler material inside. Such absorbent filler material contains petrophilic micro-organisms which enable it to absorb the oil drained from the crankcase of a car and prevent it from leaching back out into the environment. When the oil comes in contact with the petrophilic micro-organisms in the filler material, those petrophilic micro-organisms act upon the oil and begin a bio-remediation process whereby the danger represented by the hydrocarbons in the oil is reduced to a level which is considered acceptable by most general waste facilities. Accordingly, the entire oil pan, with filler material and used oil contained inside, may be simply disposed of along with one's general supply of trash.

14 Claims, 1 Drawing Sheet

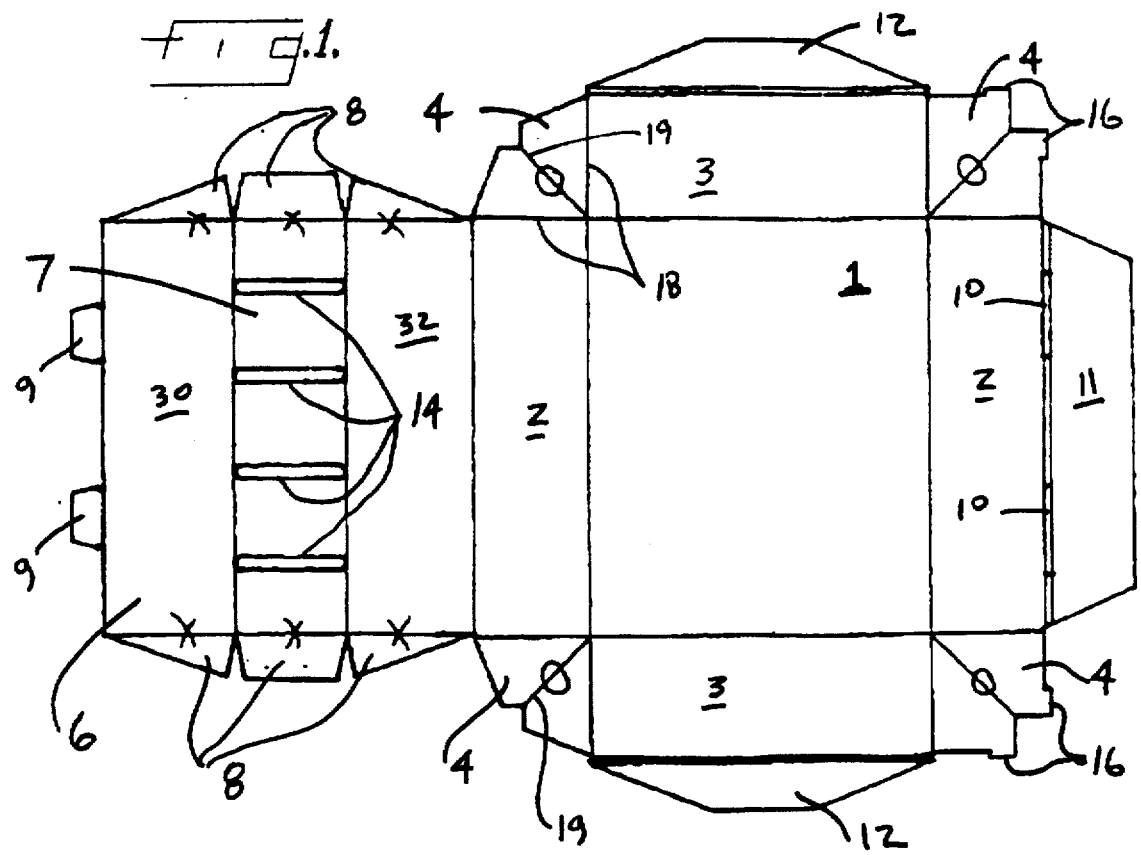
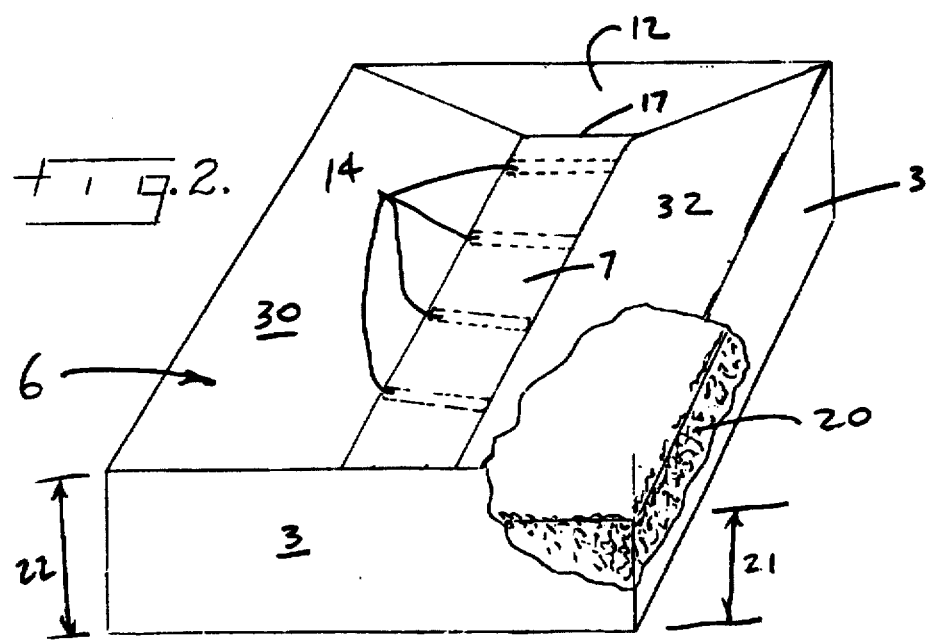

5,716,840

DISPOSABLE OIL PAN WITH BIO-REMEDIATION FILLER

The present invention relates generally to convenient do-it-yourself oil change kits which assist in the collection of used motor oil and, more specifically, to an inexpensive and disposable oil pan partially-packed with an absorbent material which absorbs such oil and which naturally reduces the amount of hydrocarbons in the absorbed oil to such a level that the entire pan/material/oil package may be disposed of in a general, non-hazardous waste landfill.

BACKGROUND OF THE INVENTION

These days, more and more car owners are changing the motor oil in their own cars in an effort to reduce the overall costs associated with maintaining their vehicles. While the actual process of draining the used motor oil from a car is relatively simple, the determination of just what to do with that oil is far more problematic.

Unlike a commercial oil change facility, an individual does not have the luxury of having an independent oil reprocesser conveniently drop by to collect the used oil and take it to a facility for recycling purposes. Rather, individual car owners must transport the used oil themselves to authorized oil collection facilities for its environmentally proper, and legal, disposal.

In connection therewith, several different types of containers have been developed—some disposable, some reusable—to assist individuals with the collection and transportation of their used motor oil. Indeed, many oil collection facilities permit the deposit of used oil only if it is in an approved container and only if such container is taken back by the individual who brought it in.

An attempted improvement in this area is a container design which includes an absorbent medium inside. This design was intended to alleviate the potential for oil spillage from such containers during the collection and transportation of used motor oil. Such absorbent medium acts as a sponge to "hold" the oil within the container and does not have an effect on the chemical composition of the oil.

Indeed, there are a variety of commercial products available (not necessarily designed for automobile oil change purposes) which assist in the absorption of oil but do not affect the oil's chemical composition. Typical of such products are calcinated clay, granular clay, corn cob, saw dust, dried peat moss and polypropylene. Absorption of oil via these products still requires proper disposal with a hazardous waste facility.

Given the relative inconvenience of the entire disposal process, however, the fact remains that much of the used motor oil which individuals drain from their automobiles is simply dumped into sewers, poured out into the ground or combined with one's normal trash for disposition at a general waste landfill. Not only are these practices environmentally hazardous, they are illegal as well.

Ideally, what is still needed in this field is an apparatus and/or method which allows an individual to drain the oil from an automobile crankcase and subsequently dispose of such oil in a manner which is as easy as throwing away common everyday trash.

SUMMARY OF THE INVENTION

The present invention combines the simplicity of an inexpensive disposable oil pan with a unique absorbent filler material. This filler material not only completely absorbs the oil from an automobile's crankcase but also allows the oil to be disposed of in a safe and environmentally sound manner. By using a kit of the present invention, the environmentally dangerous hydrocarbons contained in the oil are effectively reduced to such a level which renders the remaining oil acceptable to most general waste landfills.

The preferred oil pan embodiment is one which is formed from a stamped cut-out of paperboard, such as corrugated paperboard. These stamped cut-outs minimize the costs associated with their manufacture and distribution. Once folded into its constructed form, the disposable oil pan is substantially rectangular in shape with a somewhat concave top to receive the used motor oil from a crankcase. Along a center axis of this concave top reside a plurality of small holes which allow the oil to pass through to the inside of the oil pan.

The complete oil pan product, which consumers may purchase on the retail level, is supplied with the absorbent filler material already inside the oil pan. When the container is removed from its sales packaging and the perforated slots are displaced, the product is ready to use. This filler material occupies approximately the lower half of the interior space of the oil pan and is more than capable of absorbing the entire five quarts of oil which is held in a standard automobile crankcase.

The filler material is a lightweight, non-toxic product which is developed from an agricultural by-product and which contains such desirable elements as nitrogen, sulfur and phosphorous, and naturally occuring petrophilic microorganisms. This particular composition creates an ideal condition within which certain hydrocarbon-consuming microbes can rapidly reproduce. Once the hydrocarbons come in contact with the filler material they are encapsulated and cannot be extracted. The encapsulated droplets of available hydrocarbons are then consumed as food by the active bacteria, which are activated in the presence of moistures, thus, contributing to the bio-remediation process when the package is placed in a landfill.

The effect of this process is significant. Motor oil is categorized as a hazardous waste product and its disposal must be in strict accordance with hazardous waste guidelines. Conversely, used oil in a package of the present invention may be conveniently disposed of in a general waste facility along with common everyday trash.

BRIEF DESCRIPTION OF THE DRAWING

For a more complete understanding of this invention, reference should now be made to the embodiment illustrated in greater detail in the accompanying drawing and described below. In the drawing:

FIG. 1 is a top view of the corrugated paperboard cutout constituting the unconstructed oil pan of the present invention; and FIG. 2 is a perspective view of the oil pan having portions removed to exhibit the absorbent filler material contained therein.

Notice must be taken that the figures are not necessarily to scale and that the embodiments are sometimes illustrated by phantom lines and diagrammatic representations. In certain instances, details which are not necessary for an understanding of the present invention or which render other details difficult to perceive may have been omitted. It should be understood, of course, that the invention is not necessarily limited to the particular embodiments illustrated herein.

DETAILED DESCRIPTION OF THE DRAWING

Turning first to FIG. 1, what is shown is the unconstructed corrugated paperboard cut-out of the preferred oil pan embodiment of the present invention. As is the case with many disposable/recyclable boxes or containers used in commerce today, this particular oil pan embodiment, stamped from a single sheet of lightweight corrugated paperboard, minimizes the cost associated with its manufacture, distribution and construction.

In FIG. 1, the solid lines represent actual cut lines which define either the outermost edges of the piece or interior areas which have portions of paperboard removed. In addition, the paperboard cut-out's entire surface area which is shown, that which ultimately comprises the interior of the fully-constructed oil pan, is preferably covered with a very thin layer of biodegradeable coating. Such coating, which may be wax, is intended to resist oil leakage once the paperboard cut-out is formed into the preferred embodiment and used as intended.

Specifically, the preferred embodiment of the unconstructed oil pan includes a bottom 1, two sides 2, two ends 3, convergent top panels 6 and a gutter 7. The aforementioned elements comprise the six basic exterior surfaces of the substantially box-shaped oil pan (constructed) as shown in FIG. 2. As sides 2 and ends 3 are raised to a substantially perpendicular position with respect to bottom 1, corner flaps 4 and 5 are inwardly positioned so as to provide substantially leakproof corner folds or creases 18 and 19. Thereafter, corner flaps 5 are laid flat against their adjacent end 2 whereby corner tabs 16 fit into the slots 10 in the side panel 2 for purposes of holding the side panel 2 in place after assembly.

Once the bottom 1, sides 2, ends 3, and corner flaps 4 are constructed to form a substantially rectangular and open box-like structure, top panel 6 with central panel 7 are folded and laid over the top. After side edge piece 11 is folded inwardly, closure tabs 9 are downwardly inserted into slots 10 so as to secure the closure of the oil pan thereto. It should be noted that top panel 6 has two panel portions 30 and 32, and a slotted central panel 7. As the pan is assembled, top panel tabs 8 lay flush against their adjacent ends 3 and point upwards with respect to bottom 1. As a final step in construction, inner end flaps 12 are folded downward into the pan wherein they are held generally parallel against their adjacent respective ends 3 abut their respective edges 17 of the gutter formed by the top panels 7, 30 and 32. Such construction ensures the proper alignment of the drain slots 14 along a center access of the oil pan. [INSERT "A" TEXT—must be found]

Referring now to FIG. 2, the preferred oil pan embodiment of the present invention is shown fully constructed. The top of this oil pan is particularly shaped so as to conveniently collect, and retain, motor oil which is drained from an automobile's crankcase. Specifically, top panel portions 30 and 32 of the oil pan slant downwardly and inwardly from sides 2 whereupon they connect the central panel 7 to form a gutter. Inner end flaps 12 are vertically positioned against the edges of both top panels 30 and 32 and center panel 7 so as to prevent any motor oil from flowing outside of the oil pan. As the motor oil is collected in the area of the gutter 7, drain holes 14 allow such oil to pass down into the interior of the oil pan.

As shown by the cut-away view of the oil pan in FIG. 2, an absorbent filler material 20 is maintained in the interior of the oil pan to absorb the motor oil which passes through the drain slots 14. It is preferable that this filler material 20 be present in sufficinet quantity so that both the length and width of the oil pan are covered. In addition, the filler material 20 has a height 21 which is measurably less than the oil pan height 22 and which is spaced just below the level of the drain holes 14. Since the filler material 20 occupies a large portion of the oil pan's interior space, there is little chance that the motor oil which passes through drain holes 14 will not be absorbed by the filler material 20 before coming into contact with the interior surfaces of the oil pan.

The preferred filler material 20 used in the present invention is a non-toxic, cotton fiber product which is an agricultural by-product resulting from the removal of cotton seeds from raw cotton. The filler is a combination of cotton lint and raw de-seeded cotton, and preferably meets all relevant OSHA requirements. Alternatives to this preferred material include a combination of cellulosic fibers and the above-referenced cotton filler, and fiberous materials which are by-products of soybean processing. This filler material preferably also contains bacteria cultures, such as *Bacillus subtilis*, which produce enzymes, and which beneficially interact with the hydrocarbons contained in the motor oil. When activated, the bacteria has an ideal condition within which to reproduce. The addition of bacteria cultures to the filler material 20 achieves a bioconversion of petroleum hydrocarbons through catabolic and metabolic enzyme digestion, under both anaerobic and aerobic conditions. An effective filler material for use in the present invention in which the absorbent organic materials have been premixed with petrophilic microorganisms is available from PHase III, Inc. which is located in Chandler, Ariz. and is sold under the trademark OIL SPONGE™. In that material, the concentration of bacteria is indicated as being approximately 27 billion living bacteria per five pounds of absorbant.

Once the hydrocarbons in the motor oil come in contact with the filler material 20 they are encapsulated (up to the saturation level) and cannot be extracted by ordinary contact with groundwater. Indeed, the filler material 20 will actually give up water in order to accept additional hydrocarbons. The encapsulated droplets of available hydrocarbons are then acted upon by the active bacteria to break-up the hydrocarbons in the motor oil.

The quantity of filler material 20 which is contained within the oil pan is more than sufficient to completely absorb the standard five quart quantity of motor oil which is contained in an engine's crankcase since the filler material 20 can absorb up to five times its own weight in oil. As it effectively absorbs the hydrocarbons contained in the oil, the filler material 20 helps reduce worries about hydrocarbons leaching back into the ecosystem and contaminating streams or the water table.

The bacteria cultures useable in the present invention have been tested and proven effective in the bio-remediation of soil. The inclusion petrophilic micro-organisms in the filler of the container of the present invention to act upon the hydrocarbons contained in motor oil, as described herein, has an impact on how the motor oil may be disposed of. Indeed, motor oil which remains chemically unchanged must, in accordance with relevant environmental regulations, be disposed of in either a hazardous waste facility or a recycling facility. Conversely, motor oil which has been subject to an effective bio-remediating agent, whereby the environmental dangers arising from the presence of hydrocarbons in the oil is reduced to a an acceptable level, can be disposed of along with its associated disposable oil pan in a general waste facility.

Accordingly, once a "do-it-yourself" user of the present invention uses the oil pan to collect used motor oil, he or she may then simply transport the entire oil pan (including the filler material and absorbed oil) to a general waste facility for disposal, whereupon the aforementioned bio-remediation process is allowed to take effect.

It should be understood that the above described embodiment is intended to illustrate, rather than limit, the invention and that various modifications could be made thereto without departing from the scope of the invention as defined by the appended claims. For example, an alternative embodiment is one which includes a lightweight, blow-molded plastic oil pan having approximately the same dimensions as the fully-constructed oil pan described above. Indeed, the particular size and shape of the disposable oil pan used is not particularly significant. One of the significant aspects of the present invention lies in the unique combination of a disposable oil pan with a filler material contained therein which allows bio-remediation of a landfill into which the pan is placed for disposal.

Similarly, it is within the contemplation of the present invention that the combination of a disposable oil pan with a filler material, including a bio-remediating agent such the microbes discussed above, be used in connection with the collection and disposal of a variety of substances which contain hydrocarbons including, but not limited to, diesel fuels, jet fuels, paraffin oils, silicon oils, cutting oils, paint, fats, grease, and other household waste oils.

While the present invention has been illustrated in some detail according to the preferred embodiment shown in the foregoing drawing and description, it will become apparent to those skilled in the pertinent art that variations and equivalents may be made within the spirit and scope of that which has been expressly disclosed. Accordingly, it is intended that the scope of the invention be limited solely by the scope of the hereafter appended claims and not by any specific wording in the foregoing description.

We claim:

1. An apparatus for facilitating both the effective collection of used motor oil from an engine crank case and the treatment of hydrocarbons contained therein, the apparatus comprising:
   a. a container, said container being of sufficient capacity to hold all of said oil drained from said crank case and having means for allowing said oil to pass through to an interior of said container; and
   b. an absorbent material disposed within said interior of said container for contacting oil, said material capable of absorbing said oil and said oil in said container; and wherein said material contains microbes which act upon hydrocarbons from said oil, said microbes being bacteria which digests at least a portion of said hydrocarbons.

2. The apparatus of claim 1 wherein:
said hydrocarbons are unable to leach out of said body of absorbent material once said oil is absorbed by said body.

3. The apparatus of claim 2 wherein:
said body of absorbent material is formed from a biodegradable cotton.

4. The apparatus of claim 3 wherein:
said container is formed from biodegradable material.

5. The apparatus of claim 4 wherein:
a combination of said container, said body of absorbent material and said oil constitutes a substantially entirely biodegradable package which, as a result of action upon said hydrocarbons by said microbes reduces contaminating effects of said hydrocarbons to a level deemed acceptable for general waste requirements, may be disposed of in a landfill having said general waste requirements rather than a landfill designed for hazardous waste.

6. The apparatus of claim 5 wherein:
said container is formed from corrugated paperboard and an interior surface of said container includes a light biodegradable coating resistant to grease and oil.

7. The apparatus of claim 6 wherein:
said container is generally rectangular in shape and includes a bottom, side and end walls, and a top, said top having a slightly depressed center area to which said oil converges after being poured on said top, said depressed center area being the location of said means for allowing said oil to pass through to said interior of said container.

8. The apparatus of claim 7 wherein:
said means for allowing said oil to pass through to said interior includes a plurality of spaced-apart apertures.

9. The apparatus of claim 8 wherein:
said body of absorbent material is formed into a generally rectangular shape of approximately the same length and width as said container and of a height which is slightly less than a height of said container.

10. A method of collecting used motor oil from an engine crank case and absorbing said oil with a body of absorbent material to effect the substantial bio-remediation of hydrocarbons contained therein, the method comprising the steps of:
   a. placing an oil-collection container in position to receive all of the used motor oil from an engine's crank case, said container having means for allowing said oil to pass through to an interior of said container;
   b. allowing all of said oil to pass through to said interior of said container;
   c. absorbing said oil with said body of absorbent material, said body retained within said interior of said container; and
   d. treating said hydrocarbons with microbes carried by said absorbent material.

11. The method of claim 10 wherein:
said bio-remediation of said hydrocarbons involves exposing said hydrocarbons from said oil to a bacteria carried by said absorbent material to act upon said hydrocarbons, and further comprising the step of preventing said hydrocarbons from leaching out of said body of absorbent material once said oil is absorbed by said body, wherein said body of absorbent material is formed from a biodegradable cotton fiber and includes nitrogen, sulfur and phosphorous, and wherein said container is formed from biodegradable material, and an interior surface of said container includes a light coating of biodegradable wax.

12. The method of claim 10 wherein:
said container is generally rectangular in shape and includes a bottom, side and end walls, and a top, said top having a slightly depressed center area to which said oil converges after being poured on said top, said depressed center area being the location of said means for allowing said oil to pass through to said interior of said container.

13. The method of claim 10 wherein:
said means for allowing said oil to pass through to said interior includes a plurality of spaced-apart apertures.

14. The method of claim 10 wherein:
said body of absorbent material is formed into a generally rectangular shape of approximately the same length and width as said container and of a height which is slightly less than a height of said container.

* * * * *